United States Patent [19]

Renner

[11] 4,325,124
[45] Apr. 13, 1982

[54] SYSTEM FOR CONTROLLING THE DIRECTION OF THE MOMENTUM VECTOR OF A GEOSYNCHRONOUS SATELLITE

[75] Inventor: Udo Renner, Leiden, Netherlands

[73] Assignee: Organisation Europeenne de Recherches Spatiales, Noordwijk, Netherlands

[21] Appl. No.: 118,847

[22] Filed: Feb. 5, 1980

[30] Foreign Application Priority Data

Feb. 28, 1979 [BE] Belgium .................................. 193756

[51] Int. Cl.³ ........................ G06F 15/50; B64G 1/44
[52] U.S. Cl. .................................... 364/459; 136/292; 244/164; 244/173; 244/176; 364/434
[58] Field of Search ............... 364/459, 443, 449, 434; 136/245, 292; 244/164, 168, 173, 176, 169, 171, 172

[56] References Cited

U.S. PATENT DOCUMENTS

| | | | |
|---|---|---|---|
| 3,439,884 | 4/1969 | Slater | 364/459 X |
| 3,758,051 | 9/1973 | Williams | 244/173 X |
| 3,937,423 | 2/1976 | Johansen | 244/169 X |
| 4,114,841 | 9/1978 | Muhlfelder | 364/459 X |

OTHER PUBLICATIONS

Smets—"The Optical Sensors of the Netherlands Astronomical Satellite (ANS); Philips Technical Review; vol. 34, No. 8, pp. 208–212, 1974.

Primary Examiner—Joseph F. Ruggiero
Attorney, Agent, or Firm—Fitzpatrick, Cella, Harper & Scinto

[57] ABSTRACT

A system for compensating the disturbance torques applied to a satellite, which eliminates the requirement for a thruster control loop. The disturbance torque itself is used as the compensating torque in order to superimpose to the incidental misalignment of the solar panel arrays an artificial misalignment that can cause the momentum vector to be adjusted to the desired direction in order to restore the correct attitude of the satellite. The direction of the momentum vector is controlled in orbit only by solar sailing, that is by organizing at prescribed times suitable manoeuvres of one of the solar panels in order to adjust the solar panel array configuration when the roll angle of the satellite exceeds a determined threshold value.

4 Claims, 7 Drawing Figures

SYSTEM FOR CONTROLLING THE DIRECTION OF THE MOMENTUM VECTOR OF A GEOSYNCHRONOUS SATELLITE

BACKGROUND OF THE INVENTION

The present invention relates to a system for controlling the direction of the momentum of a satellite in a geosynchronous orbit, thereby to control the attitude of the satellite.

The attitude control mechanism has the purpose of compensating the disturbance torques applied to the satellite. With a satellite having solar panels which are deployed when in orbital configuration, it is known that the main source of disturbance is the torques due to the solar pressure on the deployed solar panel arrays which are deformed such that they are not kept in perfectly symmetrical extension. In effect, the solar arrays are generally deformed due to internal stresses resulting for instance from the thermal pressure of the sun and said internal stresses cause the solar panels to be unsymmetrically deformed by tension and bending torques. An example of deformation caused by bending torque is illustrated on FIG. 1 which represents schematically a satellite S having two deployed solar panels P. One clearly notices the unsymmetrical curvature which is caused to the solar panels. The disturbing torques resulting from said unsymmetrical deformation ought to be compensated otherwise they would cause substantial drift rate of the satellite. Typical values for the drift rate are 0.02 degree/day caused by torsion torque and 0.2 degree/day caused by bending torque.

To date the attitude control mechanism usually comprises activating a suitable one of the on-board thrusters of the satellite when the roll angle reaches a predetermined threshold. Such a control mechanism requires a control loop which necessitates rather complex equipment implementation and which calls for large fuel consumption for activating the thrusters.

SUMMARY OF THE INVENTION

The problem which the invention aims at to solve is to provide an attitude control system for satellite which eliminates the requirement for a thruster control loop and which consequently is more economic and more flexible than the known systems.

The invention has for object a new system for compensating the disturbance torques which is based on the principle of using the disturbance torque itself as the compensating control torque in order to super-impose to the incidental misalignment of the solar panel arrays an artificial misalignment that can cause the momentum vector to be adjusted to the desired direction in order to restore the correct attitude of the satellite.

The purpose of the invention is to control the direction of the momentum vector of a satellite in orbit only by solar sailing, that is by organizing at prescribed times suitable maneuver of one of the solar panels in order to adjust the solar panel array configuration when the roll angle of the satellite exceeds a determined threshold value.

The advantages of the control system in accordance with the invention are primarily: (1) it assures a correction of the disturbance torques without using complex and costly equipment and without fuel consumption, (2) it achieves a correction which is best adapted to the level of the disturbance torques, (3) it assures an inherent damping of the nutation movement of the satellite.

DESCRIPTION OF AN EMBODIMENT

Figure 1:
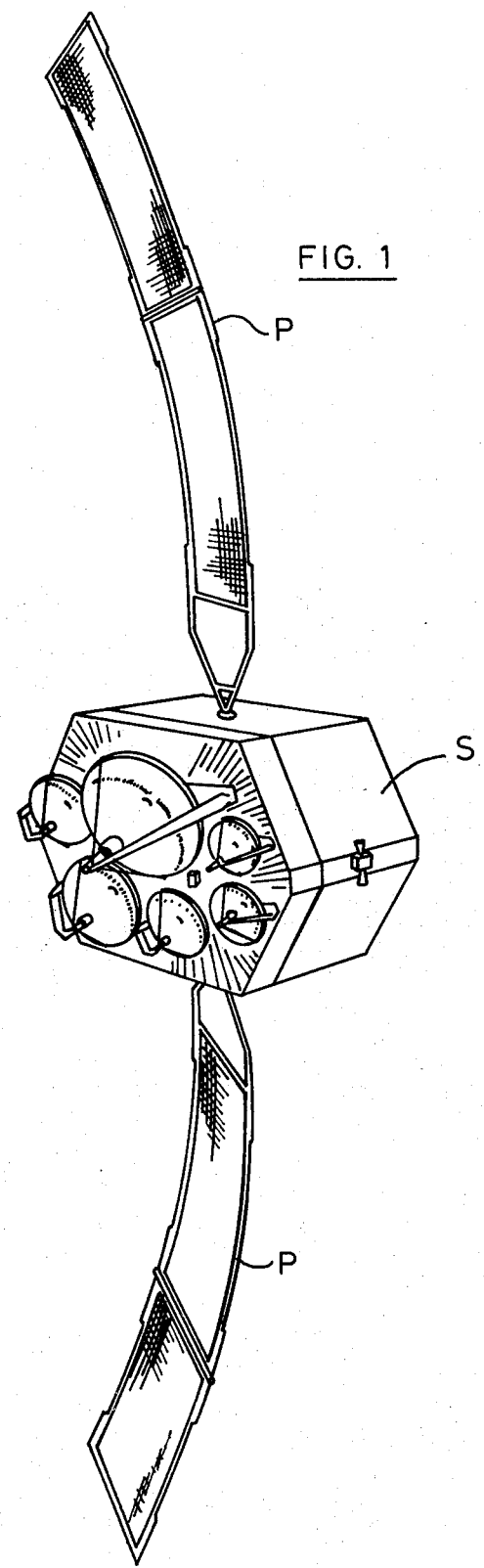
FIG. 1 illustrates a typical deformation caused to the deployed solar panels of a satellite in flight.
Figure 2:
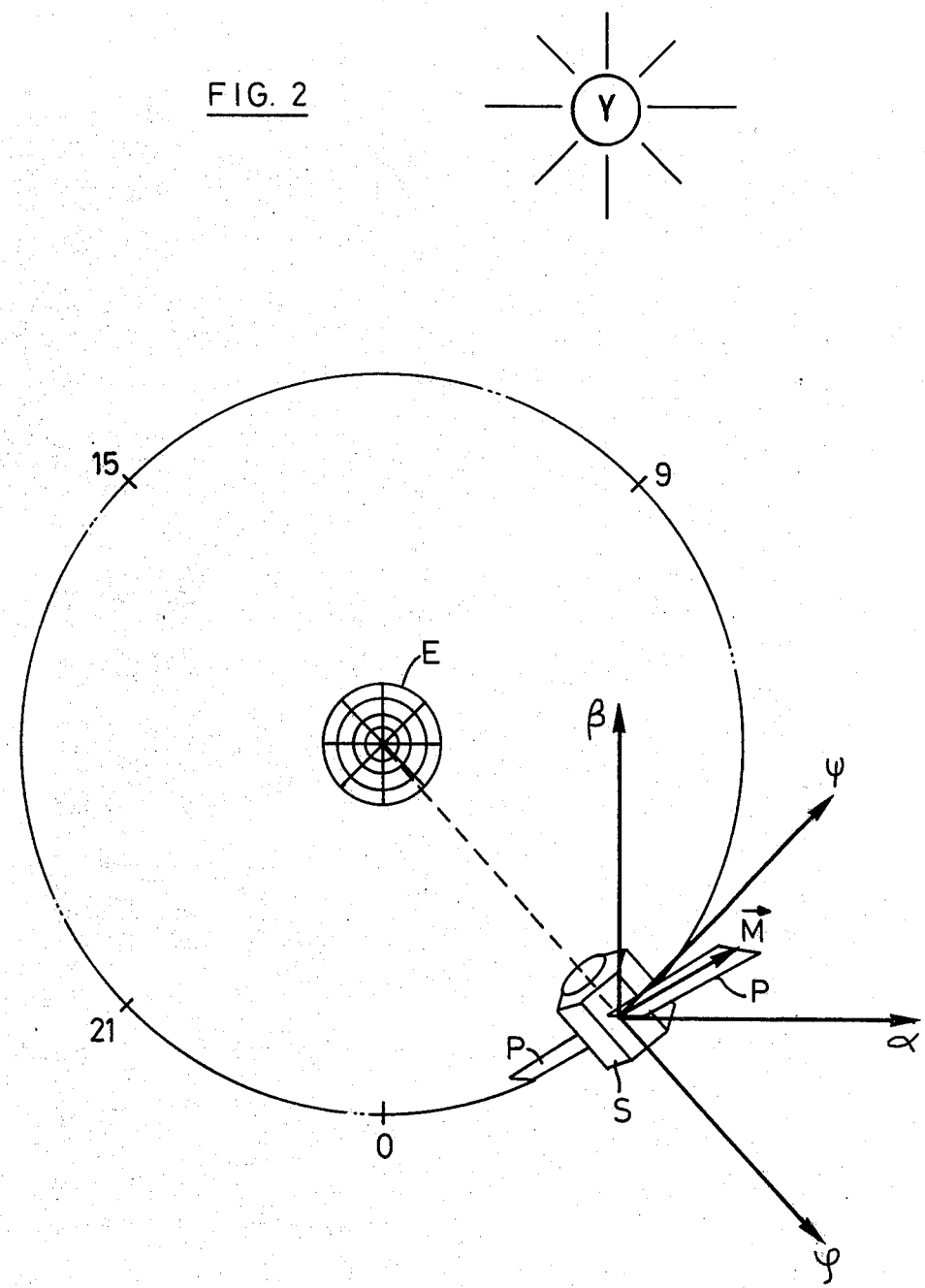
FIG. 2 is a schematic representation of the orbital plane of a satellite with indication of the coordinates systems used to define the problem of the satellite attitude control mechanism.

Before starting with the description of the method in accordance with the invention it will be useful to clearly define the problem of the attitude control of a satellite by referring to FIG. 2. This figure represents a satellite S placed in a geosynchronous orbit around the earth E. The plane of the drawing is the orbital plane with the sun represented at Y. As illustrated, the satellite S has two solar panel arrays called North and South. The centre of gravity of the satellite S provides the origin of two co-ordinates systems: an earth oriented system $(\varphi, \psi)$ and a sun oriented system $(\alpha, \beta)$. The axis $\varphi$ is the roll axis, its direction passes through the earth's centre. The axis $\psi$ is the yaw axis pointing in the flight direction. The axis $\beta$ is the projection of the sun direction onto the orbital plane. The axis $\alpha$ is perpendicular to the axis $\beta$.

The parameter to be controlled is the momentum vector M. Its direction has to be defined in terms of $\alpha$ and $\beta$. However, the only parameter which is physically available is the roll angle $\varphi$. Thus the method of the invention is organized for controlling the solar panel array configuration directly on basis of the sensing of the roll angle $\varphi$.

The situation when considering the attitude control mechanism is the following: the satellite is in its orbit and the solar panel arrays are continuously tracking the sun under the control of solar array drives. The plane of each solar panel array is inclined by an angle $\gamma$ to the axis $\alpha$.

In accordance with the invention, at defined times the roll angle $\varphi$ is sensed by so-called earth sensor, known per se, and when its value exceeds a predetermined threshold, a control signal is gated to inhibit one solar array drive. Let it be assumed for instance that the South panel array drive is inhibited, with the North panel array only being continuing to track the sun. Due to the change in the solar panel array configuration, the angle $\gamma$ of the disabled array varies and the momentum vector $\vec{M}$ accumulates the following precession angles:

$$\alpha = \frac{PAd}{\omega_o H}\left[(1 + r)\gamma - \left(1 + \frac{r}{2}\right)\sin\gamma - \frac{r}{6}\sin 3\gamma\right]$$

-continued $$\beta = \frac{PAd}{\omega_o H} r \left( \frac{2}{3} - \frac{1}{2} \cos \gamma - \frac{1}{6} \cos 3\gamma \right)$$

where
P=solar pressure
A=solar panel array area exposed to the sun
d=distance of the centre of solar pressure on each array to the centre of gravity of the satellite
r=solar reflectivity factor
H=angular momentum of the momentum wheel on board the satellite.

The inhibition of the south array drive thus produces a control torque which causes the orientation of the south panel array to vary relative to the sun position, that is the array angle $\gamma$ varies. The inhibition of the south array drive will be maintained during a predetermined time period at the end of which the array angle $\gamma$ of the south solar panel array will reach a predetermined value. Then the south array drive is re-enabled, thereby allowing the south solar panel array to reacquire its nominal position, and so does it within a few minutes.

Figure 3:
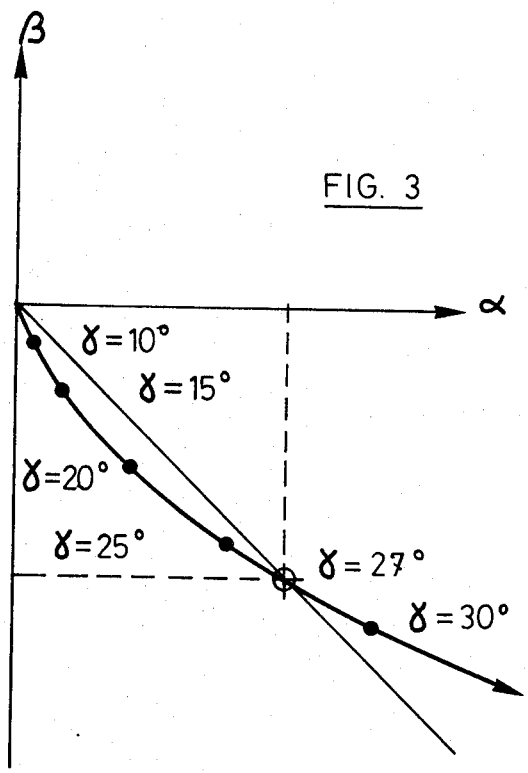
FIG. 3 is a diagram showing the values for the precession angles for various inclinations of a solar panel.

FIG. 3 shows the precession angle values for different values of the array angle $\gamma$ for the south solar panel array. It can be seen that for the angle $\gamma$ being approximately 27°, the precession angles $\gamma$ and $\beta$ have the same value. Preferably the inhibition period will last until the array inclination angle $\alpha$ reaches the value of 27°. Said value is reached after a known time period, which is 108 minutes in a geostationary orbit.

Figure 4:
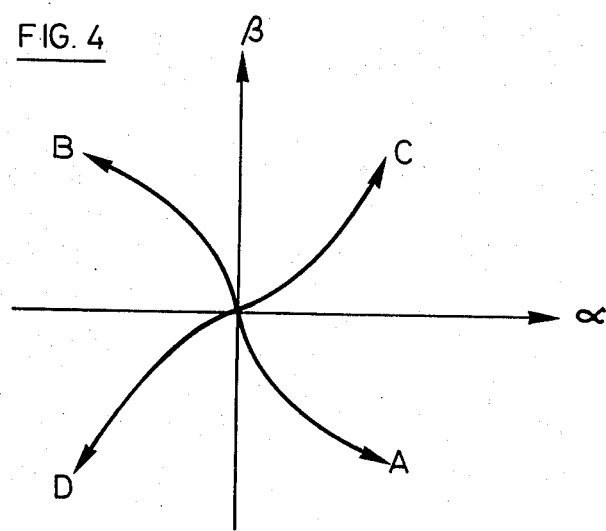
FIG. 4 is a diagram illustrating the different types of maneuvers in accordance with the method of the invention.

Similar maneuvers can be controlled for compensating a roll angle in each of the four quadrants, thus providing four types of maneuvers which will be called A, B, C, D. The maneuvers A has been described above. The maneuver B is similar to maneuver A but applied to the north solar panel array. The maneuver C consists in driving the south solar panel array until its inclination angle $\gamma$ is $-27°$, then inhibiting the south array drive during a predetermined time period and finally re-enabling the south array drive again. The maneuver D is similar to the maneuver C but applied to the north solar panel array. These four maneuvers are illustrated by the diagram of FIG. 4. The choice of the type of maneuver best suitable to improve the satellite attitude depends on the satellite position along its orbit, that is on the time of the day at which the control will occur, and on the polarity of the roll angle at the reading time.

The roll axis, it is known, scans around the earth once per 24 hours and therefore to implement an unambiguous control strategy, typically four readings of the roll angle will be made at the following times: 3, 9, 15 and 21. On FIG. 2 the satellite S is shown in its position at time 3. The other three positions for the typical control strategy as mentioned hereabove are labelled 9, 15 and 21.

The control in the system according to the invention is made by a control logic unit normally installed on board the satellite. Said logic unit (to be described later in more detail) is organized to check at prescribed times distributed along each 24-hour period, whether the roll angle value, as sensed by earth sensor means, exceeds a prescribed threshold value $\varphi t$. When the roll angle is sensed as being exceeding the prescribed threshold, the logic unit gates a control signal Uc for initiating the suitable control maneuver to improve the satellite attitude. At each given time, the determination of the roll angle is sufficient to unambiguously determine the proper correction maneuver to be made. The deviation of the roll angle from said threshold value can be considered in positive and/or negative polarity. The table below lists the suitable correction maneuvers available to the control logic at different times of the day depending on the polarity of the deviation of the roll angle.

| Reading time | $\varphi > \varphi t$ | $\varphi < -\varphi t$ |
|---|---|---|
| 3 | B | A |
| 9 | D | C |
| 15 | A | B |
| 21 | C | D |

The reading of the above table is quite easy. For example, at time 15 a maneuver A only will improve the satellite attitude when the roll angle is positive and beyond the threshold $\varphi t$, but a maneuver B will be the correct maneuver to be performed when the roll angle is negative and beyond the threshold.

Figure 5:
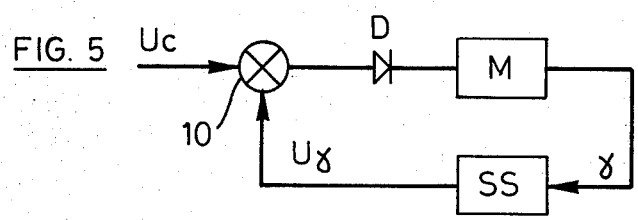
FIG. 5 is a schematic representation of a control loop as controlled by the system of the invention.

The control logic is organized to process the roll angle signal at defined times and to produce, depending on the reading time, a suitable control signal $U_c$. The latter is used in a control loop which is schematically represented in FIG. 5. The rectangle labelled M represents the drive motor for a solar panel, the diode D represents the unidirectional characteristic of the motor M, and the rectangle labelled SS represents the solar sensor (an apparatus well known in the art for sensing the solar aspect angle) which is associated with the solar panel. The control loop also includes a multiplier 10. The control signal $U_c$ from the control logic has three states: zero, level $+U$ and level $-U$. The signal $\gamma$ represents the inclination angle of the solar panel and the signal $U\gamma$ is the signal generated by the solar sensor SS for the inclination angle $\gamma$ of the panel. The signal level $+U$ corresponds to an angle equal to 27° and the level $-U$ corresponds to the an angle $\gamma$ equal to $-27°$.

When the control signal $U_c$ is zero, the signals $\gamma$ and $U\gamma$ are approximately zero. The motor M is stopped. When the control signal $U_c$ is at level $+U$, the motor M drives the solar panel until, a few minutes later, the signal $U\gamma$ and then the motor M stops. On the contrary, when the signal Uc switches to state zero or $-U$, the motor M is stopped and the inclination angle $\gamma$ of the solar panel varies as a consequence of the orbital speed of the satellite at the rate of 15 degrees per hour in a geostationary orbit, said inclination angle $\gamma$ reaching the value of 27° after 108 minutes.

Figure 6:
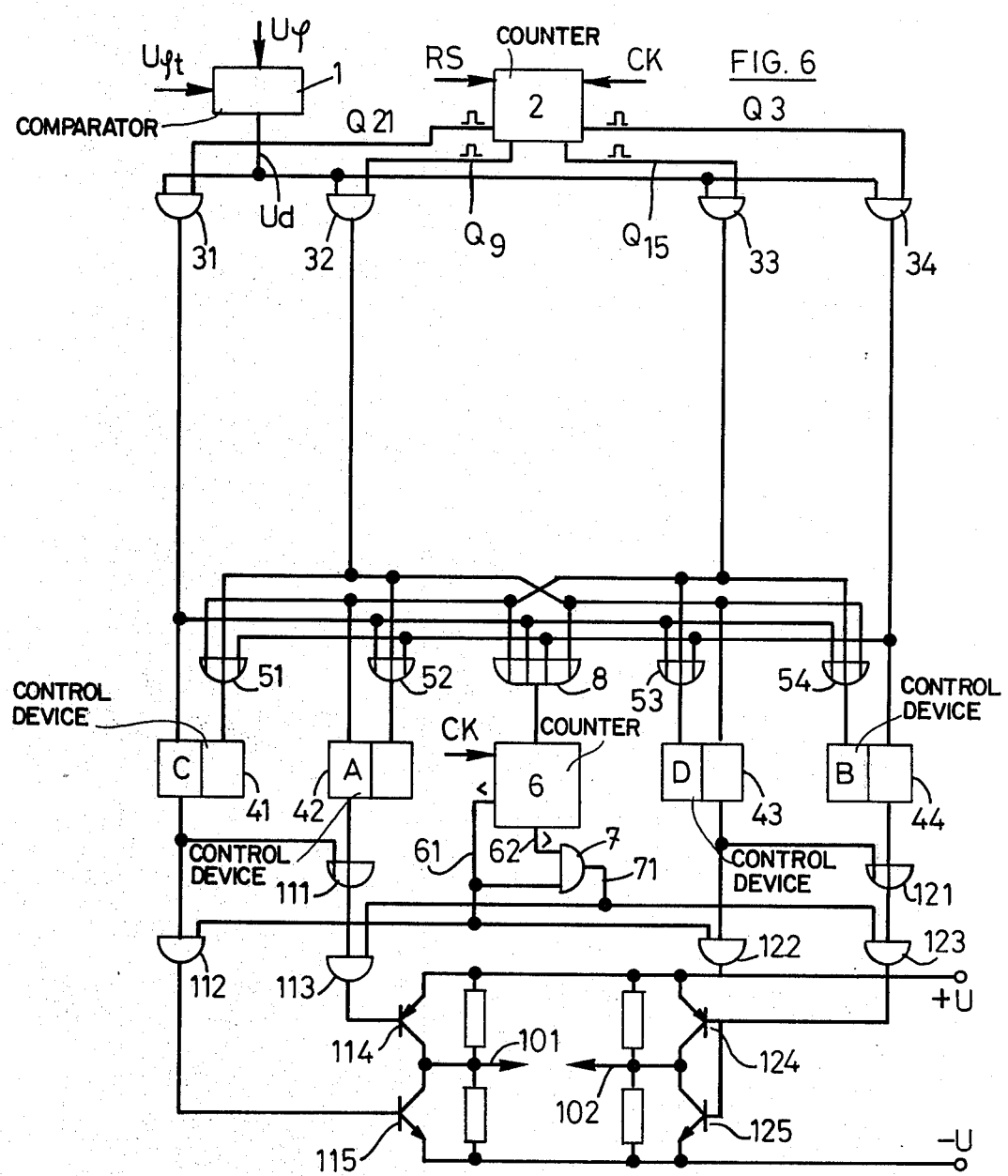
FIGS. 6 and 7 are schematic diagrams of two exemplary embodiments of the control logic circuitry which governs the system according the invention.

FIG. 6 is a schematic diagram of an exemplary circuitry for the control logic unit in accordance with the invention. The device 1 is a comparator which accepts the signal $U\varphi$ from the earth sensor for comparing it with a threshold signal $U\varphi t$ representing the prescribed threshold for the roll angle. The comparator 1 generates a deviation signal Ud when the signal $U\varphi$ exceeds the threshold signal $U\varphi t$. The device 2 is a 24-hour counter which is clocked by signals applied to its input CK to output an enable signal at the prescribed reading times, e.g. at times 3, 9, 15 and 21 in the described embodiment. The respective enable signals are designated as $Q_3$, $Q_9$, $Q_{15}$ and $Q_{21}$. The reset input to counter 2 is designated as RS. The counter 2 is reset at the end of each 24-hour period. The set of AND-gates 31-34 are connected to respond to the coexistence of the deviation signal Ud with a respective one of the enable signals $Q_1$-$Q_4$. Thus, at each reading time one and only one AND-gate is enabled, thereby to activate a respective one of the four control devices 41-44. Each control device has the function of energizing one solar array drive in order to vary the solar panel array configuration. Two control devices 41, 42 are connected to actuate the south solar panel array drive and the other two control devices 43, 44 are connected to actuate the north solar array drive. Each pair of control devices has an output circuit arrangement associated therewith: the circuit arrangement comprising the gates 111-113 and the transistors 114-115 is associated with the the control devices 41, 42; the circuit arrangement which is associated with the other pair of control devices 43, 44 comprises the gates 121-123 and the transistors 124-125.

The pair of transistors in each output circuit are energized such as to produce on the corresponding output line 101 or 102 a control signal $U_c$ having the required state which corresponds to the prescribed correction maneuver. The output lines 101 and 102 are connected each to a control loop as shown in FIG. 5: in the illustrated example, the line 101 is coupled to the control loop for the south array and line 102 is coupled to the control loop for the north array.

The set of OR-gates 51-54 are connected to assure that, at each reading time, three control devices are disabled.

The device 6 is a counter which is associated with a gate 7 connected for measuring a prescribed time interval for each maneuver to be controlled. On line 61 there appears a high level during five minutes, for instance, in order to inhibit temporarily the transistors 115 and 124, thereby to actuate the corresponding solar panel until its inclination angle reaches the value $-27°$ (first phase of maneuver C or D). On line 62 there appears a high level during 113 minutes, for instance, (a duration of 108 minutes is enough in principle however in a geostationary orbit as explained above). The gate 7 is connected to produce on line 71 the inhibit signal for the maneuvers A and B, thereby to allow the corresponding solar panel to acquire an inclination of 27° as described hereinbefore. The OR-gate 8 is connected to reset the counter 6 at the beginning of every new maneuver.

The control system described in the foregoing is illustratively organized to perform four maneuvers a day which is sufficient for compensating the maximum disturbance torques at the solstices. However, as the time necessary for performing one maneuvers is only two hours, including the time for restoring the solar panel to its normal position, the system according to the invention can quite well be organized to perform up to twelve maneuvers a day. In such a case, it would be suitable to start the control program every day by running again the control maneuvers of the previous day, excluding of those maneuvers having opposite effects (e.g. maneuvers A and B). Running such a program requires that the maneuvers are recorded in a memory which must be provided in the control logic unit.

Figure 7:
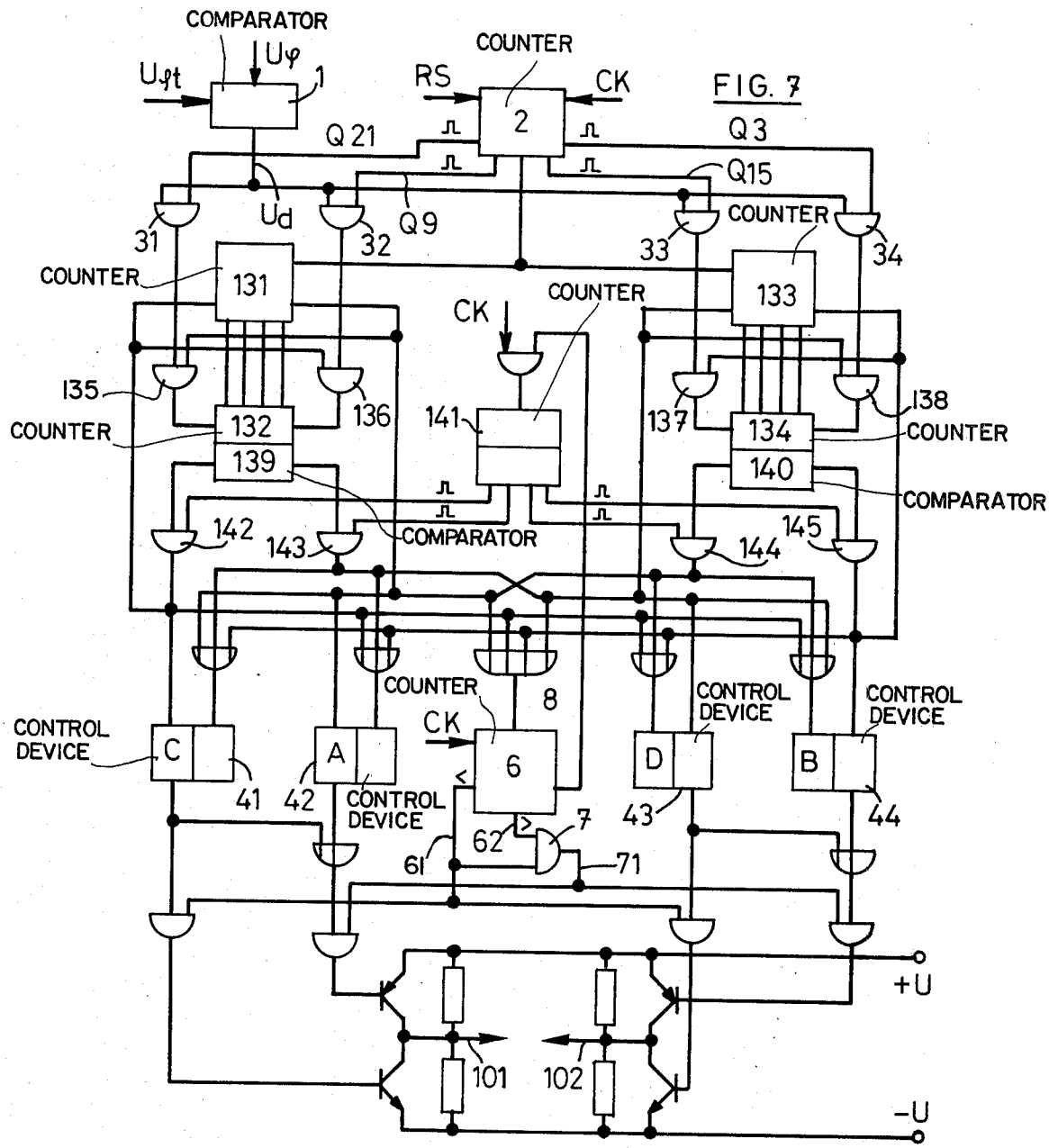

FIG. 7 is a schematic circuit diagram of the control logic unit including a store system. Basically, the circuit arrangement of FIG. 7 is similar to that of FIG. 6 except for the addition of the components 131-145 which form a store system. The elements 131-134 are up/down counters connected to store the maneuvers. The counters 131 and 133 are connected to accept a transfer pulse $Q_0$ at the reference time 0. The counters 132 and 134 are directly loaded from AND-gates 31-34 through OR-gates 135-138. Each of the counters 132 and 134 has associated with it a comparator, 139 or 140 respectively. The elements 141-145 form a sequencer arrangement for the succeeding control of the flip-flops 41-44 described previously.

It is to be understood that the control logic unit can be organized with use of various circuit arrangements as will be readily apparent to those skilled in the art and that also the logic organization can be controlled by a processor performing the necessary controls and commands for operating the system in accordance with the invention.

What is claimed is:

1. Method for controlling the direction of the momentum vector of a satellite in a geosynchronous orbit, the satellite having at least a pair of solar panel arrays driven to track the sun when deployed in orbital configuration, the method comprising the steps of:
   reading the value of the roll angle of the satellite and comparing it to a predetermined threshold value; generating a deviation signal when the roll angle value exceeds the threshold value at predetermined times;
   inhibiting one solar panel array drive in response to the deviation signal, and re-enabling said solar panel array drive after a predetermined time interval has elapsed.

2. A method according to claim 1, wherein the step of inhibiting one solar panel array drive is preceded by the step of driving said solar panel array to a predetermined inclination angle.

3. System for controlling the direction of the momentum vector of a satellite in a geosynchronous orbit, said satellite having at least a pair of solar panel arrays driven to track the sun when deployed in orbital configuration, said system comprising: comparator means connected to the output of an earth sensor for accepting a signal representing the roll angle value of the satellite and for generating a control signal in response to the roll angle signal being greater than a predetermined threshold value; time signal generator means for generating a plurality of sequential time signals;
   logic means connected to respond to the coexistence of a deviation signal with a respective one of said time signals for producing each time a respective distinct control signal;
   a plurality of bistable control devices, each being connected to be actuated in a first active state in response to a respective control signal and to produce a drive signal for changing the solar array configuration; counting means connected to the output of said control devices for fixing the duration of the drive signal.

4. A system according to claim 3, further comprising store means connected to the output of said logic means for storing the succeeding correction signals, and sequencer means connected to couple successively the control signals from said store means to the proper control device.

* * * * *

UNITED STATES PATENT AND TRADEMARK OFFICE
CERTIFICATE OF CORRECTION

PATENT NO. : 4,325,124
DATED : April 13, 1982
INVENTOR(S) : Udo Renner

It is certified that error appears in the above-identified patent and that said Letters Patent is hereby corrected as shown below:

Column 1, line 60, "maneuver" to read -- maneuvers --;

Column 3, line 36, "maneuvers" to read -- maneuver --;

Column 4, line 44, after "$U\delta$", insert -- equals Uc --.

Signed and Sealed this

Third Day of August 1982

[SEAL]

Attest:

Attesting Officer

GERALD J. MOSSINGHOFF

Commissioner of Patents and Trademarks